(12) United States Patent
Lube

(10) Patent No.: US 7,499,037 B2
(45) Date of Patent: Mar. 3, 2009

(54) VIDEO DISPLAY AND TOUCHSCREEN ASSEMBLY, SYSTEM AND METHOD

(75) Inventor: Robert R. Lube, Countryside, IL (US)

(73) Assignee: Wells Gardner Electronics Corporation, McCook, IL (US)

(*) Notice: Subject to any disclaimer, the term of this patent is extended or adjusted under 35 U.S.C. 154(b) by 0 days.

(21) Appl. No.: 11/393,372

(22) Filed: Mar. 29, 2006

(65) Prior Publication Data
US 2006/0231818 A1 Oct. 19, 2006

Related U.S. Application Data

(60) Provisional application No. 60/666,292, filed on Mar. 29, 2005.

(51) Int. Cl.
*G06F 3/041* (2006.01)

(52) U.S. Cl. ......................... 345/173; 156/581

(58) Field of Classification Search ............... 345/173, 345/156, 169; 349/12, 23; 156/344, 581
See application file for complete search history.

(56) References Cited

U.S. PATENT DOCUMENTS

| | | | | |
|---|---|---|---|---|
| 4,907,090 A | * | 3/1990 | Ananian | 348/823 |
| 5,923,319 A | * | 7/1999 | Bishop et al. | 345/175 |
| 6,088,069 A | * | 7/2000 | Farlow | 349/12 |
| 6,201,532 B1 | * | 3/2001 | Tode et al. | 345/156 |
| 6,259,491 B1 | * | 7/2001 | Ekedahl et al. | 349/23 |
| 6,356,259 B1 | * | 3/2002 | Maeda et al. | 345/173 |
| 6,483,498 B1 | * | 11/2002 | Colgan et al. | 345/173 |
| 2005/0072523 A1 | * | 4/2005 | Businger et al. | 156/344 |
| 2005/0073507 A1 | * | 4/2005 | Richter et al. | 345/174 |

* cited by examiner

*Primary Examiner*—Amr Awad
*Assistant Examiner*—Yong Sim
(74) *Attorney, Agent, or Firm*—Townsend and Townsend and Crew LLP

(57) ABSTRACT

A touch screen assembly for use with a display, such as a flat panel display. The touch screen assembly includes a transparent panel, preferably in the form of a panel of tempered glass adhered to a touch screen panel. Consoles having touch screen assemblies are also disclosed.

15 Claims, 3 Drawing Sheets

VIDEO DISPLAY AND TOUCHSCREEN ASSEMBLY, SYSTEM AND METHOD

This application claims the benefit of U.S. Provisional Application No. 60/666,292, filed Mar. 29, 2005.

FIELD OF THE INVENTION

The subject invention relates to assemblies including video display and touch sensitive screen elements. More particularly, the invention relates to a system and method for combining a flat panel display, such as, for example, a liquid crystal display (LCD) screen, with a touch sensitive device and products made thereby.

BACKGROUND OF THE INVENTION

Video displays are ubiquitous features in homes, businesses, and public places, and are primarily used to provide a visual presentation generated by, for example, personal computers, electronic kiosks, video games, PDAs, cellular phones, and the like. Until relatively recently, most large video displays have been of the cathode ray tube ("CRT") type, which employs an elongated glass vacuum tube wherein the length of the tube is proportional to the surface area of the display screen. CRT displays are typically constructed to be relatively rugged and resist impact damage, as they are constructed of thick, impact-resistant glass.

CRT displays have long been used in gaming devices, such as video poker and video slot machine type gaming consoles. Such consoles include, for example, upright and bar-top consoles, which house the gaming device's electronics, money-collection and payout mechanisms, and in which the CRT display is mounted to display graphics and text to a user. Other examples of consoles may include stand-alone, interactive, kiosk-type consoles, which may be configured to provide information or services to a user through interaction with the video display. Such gaming machines and kiosk-type consoles (collectively, "consoles") are increasingly being installed in remote locations, such as, for example, in malls or on sidewalks, where they are not continually monitored to prevent misuse or vandalism. Such consoles are thus not uncommonly subjected to violent frontal impacts from users, such as by the user's fist or a wielded item.

Touch screen devices are also well-known and have historically been combined with CRT displays and other rugged displays in gaming devices and in interactive kiosks. Touch screen devices may eliminate or reduce the need to incorporate external buttons or sensors on the console housing to allow a user to interact with the console. External buttons and sensors have the disadvantage of having to be individually installed in a console and connected to the console's electronics, which adds steps and expense to the manufacturing process. Such buttons and sensors also have the disadvantage of being susceptible to damage from users and the environment, and thus contribute to higher failure rates of the console generally. The potential for damage to such buttons and sensors is more acute where the console is installed in a remote location where console users are not continually supervised.

Console manufacturers are increasingly incorporating flat panel displays, such as liquid crystal displays ("LCD"), plasma, field emission display ("FED") video displays and the like, into consoles instead of CRT displays. Flat panel displays have the advantage of providing a suitable, and often superior, video display as compared to CRT displays, and have the further advantage of having a drastically reduced depth as compared with a CRT of equal screen size. Flat panel displays, however, and especially LCD screens, are damaged by contact or impact more easily than CRT displays.

Like CRT displays, consoles having flat panel displays may incorporate touch screen devices in conjunction with the flat panel display to eliminate the need to add buttons or sensors. A known method of combining a CRT and a touch screen includes attachment of a touch screen device directly to the outer viewing surface of the CRT using a permanent adhesive. The touch sensor itself, however, is not well suited to protect a flat panel display from damage, particularly from a frontal impact, as it is generally constructed of thin, flexible plastic sheet with associated electronics. Thus, force from a frontal impact is readily transmitted through the touch screen to the flat panel display, thereby allowing the flat panel display to be relatively easily damaged. Another problem with this type of assembly becomes evident in the event that the flat panel display becomes non-operational. In such a case, the entire assembly must be discarded because the touch screen and flat panel display are not easily separated without damaging the flat panel display screen.

One known method of attempting to use a touch screen in conjunction with a flat panel display while protecting the flat panel display from frontal impact employs laminating a touch screen directly onto a sheet of tempered glass, then affixing the glass and touch screen assembly to the front of the flat panel display. This method is not without problems, however. Tempered glass is expensive and must be cut to size, thereby increasing both materials and labor costs. In addition, tempered glass, while stronger than non-tempered glass, is still fragile and requires special handling during manufacture, installation, and use. And when installed, frontal impact may cause the tempered glass to shatter, and thus damage the display over which the tempered glass and touch screen were mounted. Another disadvantage to this assembly is the propensity for the touch screen to delaminate from the tempered glass, especially when the assembly is subjected to wide ranges of temperature and atmospheric conditions.

There is a demand, therefore, for a method of combining a flat panel display and a touch screen in such a manner so as to provide resilient protection to the display and while simultaneously retaining the size advantages thereof, and also permit the combined assembly to be repaired easily and relatively inexpensively. The present invention satisfies the demand.

SUMMARY OF THE INVENTION

Embodiments of the present invention include a touch screen assembly that includes a panel of transparent material having a panel front side and a panel back side opposite the panel front side. A touch screen device having a device front side and a device back side opposite the device front side is positioned a predetermined distance away from the panel front side and in an orientation generally corresponding to the orientation of the panel front side. And an adhesive is interposed between and attached to at least a portion of the panel front side and the device back side. In other embodiments of the invention, the adhesive is a UV curable adhesive. In other embodiments of the invention the panel of transparent material is glass, and in still other embodiments of the invention the panel of transparent material is plastic. The invention may also include a gasket interposed between the panel front side and the touch screen device back side, where the gasket is disposed around the periphery of the adhesive.

Embodiments of the invention may also include a video display positioned adjacent the panel back side, in an orientation generally corresponding to the orientation of the touch screen device. The display may also be removably attached to the panel back side. Still other embodiments of the invention include the video display having a display screen and a frame having a plurality of sides surrounding the display screen, and further including at least one frame adhesive interposed between the panel back side and at least one frame side.

Embodiments may also have a console housing having an interior and a front side that includes an opening disposed in the console front side. The touch screen assembly is disposed within the console interior and the touch screen front side is viewable through the opening. A controller configured to receive an input signal from the touch screen device and provide a video signal to the video display is disposed within the console interior and in communication with the touch screen device and the video display.

Methods of making a unitary touch screen assembly for use with a display are also disclosed. Embodiments of the methods include providing a panel of transparent material in a predetermined orientation and a touch screen device; orienting the touch screen device in a position corresponding to the orientation of the panel of transparent material; positioning the touch screen device a predetermined distance from the panel of transparent material to define a space therebetween; disposing a curable and optically clear adhesive into the space; and curing the adhesive to form a unitary touch screen assembly.

Other embodiments of the invention also include providing a video display in a position corresponding to the orientation of the touch screen device, the video display including a display screen; and positioning the video display behind the panel of transparent material such that the video display screen is visible through the touch screen device.

Still other embodiments of the invention include the panel of transparent material having a panel perimeter, and further include interposing a gasket between the panel and the touch screen device, the gasket being positioned adjacent the panel perimeter. The panel perimeter may also have a plurality of opposed straight sides with the gasket extending continuously along at least three of the sides. The adhesive may also be a UV curable adhesive, and a UV light source may be provided to cure the adhesive by exposing the assembly to the UV light source for a predetermined amount of time.

Embodiments of the invention may also include the touch screen device having a device front side and a device back side opposite the device front side, and adhesive being adhered to the device back side. A console including a housing with an interior and a front side and an opening disposed in the front side is also provided. The assembly is disposed within the console interior with the device front side being viewable through the opening. A controller may also be disposed within the console interior and configured to receive signals from the touch screen device and provide signals to the video display.

Yet other embodiments of the invention include a method of protecting a video display having a touch sensitive device operably associated with it. An adhesive is interposed between a touch screen device and a rigid panel of transparent material that bonds to both the touch screen device and the rigid panel to form a unitary touch screen assembly. The unitary touch screen assembly is removably attached to a video display. In certain embodiments of the invention, the touch screen device is spaced apart a predetermined distance from the rigid panel of transparent material. In other embodiments of the invention, the adhesive is a UV curable adhesive, and the rigid panel of transparent material is tempered glass.

Still other embodiments of the invention include removably attaching the unitary touch screen assembly to a video display that includes providing at least one pliable, adhesive strip with opposed sides with adhesive disposed on at least a portion of each side between the rigid panel of transparent material and the video display. The rigid panel of transparent material is adhered to a first strip side, and the video display is adhered to a second strip side.

These and other features and advantages of the present invention will be further understood and appreciated when considered in relation to the following detailed description of embodiments of the invention, taken in conjunction with the drawings, in which:

DETAILED DESCRIPTION

While the present invention, in one embodiment, is particularly well suited for use with an LCD screen as will be explained herein, the devices and methods described may be used with other display apparatuses with similar benefits.

Figure 1:
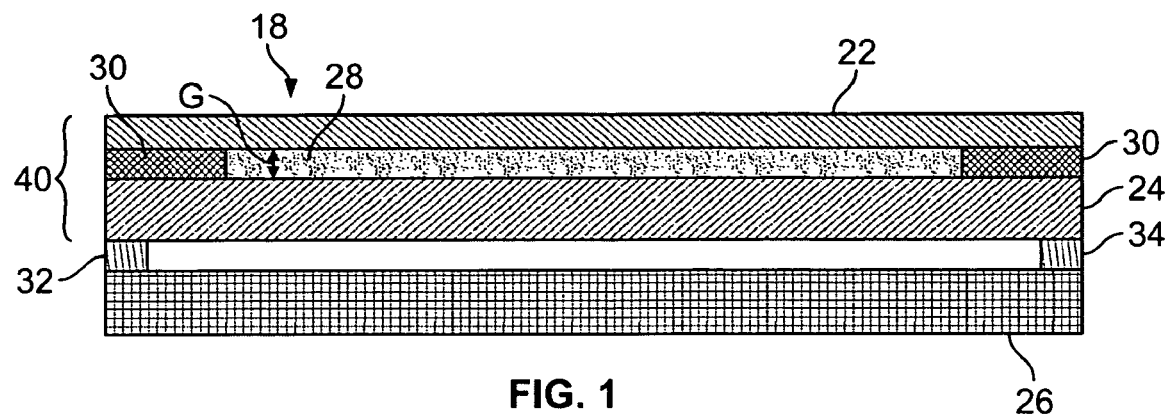
FIG. 1 illustrates a top view of a combination display unit and unitary touch screen assembly according to one embodiment of the invention.

FIG. 1 shows a combined display and unitary touch screen assembly 18 (not to scale) according to one embodiment of the invention. Generally, the combined display and unitary touch screen assembly 18 includes a planar touch screen device 22 that is contactable by the user. The touch screen device 22 is connected to and spaced a distance G from a panel of transparent material 24 to form a gap therebetween. A display 26, such as an LCD display or the like, may be connected to and spaced from the panel of transparent panel 24. In other embodiments, the display 26 and the transparent panel 24, which is further incorporated into a unitary touch screen assembly as explained below, are not connected but are mounted or otherwise maintained in a prescribed orientation to one another. The transparent panel 24 may also be placed in contact with and adjacent the display 26, or optionally spaced a predetermined distance away from the display 26 without being attached to the display 26.

A cured adhesive 28 and a peripheral gasket 30 may also be disposed in the gap G between the touch screen device 22 and the panel of transparent material 24. As will be explained in more detail below, the gasket 30 is sandwiched between the touch screen device 22 and panel of transparent material 24 at or near a periphery thereof so as to define a configuration resembling a container with an opening (see 38, FIG. 4) for permitting the addition of the adhesive material 28 in a curable, liquid form between the touch screen device 22 and the panel of transparent material 24. The touch screen device 22 combined with the panel of transparent material 24 with the adhesive 28 comprises a unitary touch screen assembly 40.

The unitary touch screen assembly 40 may also be removably attached to the display 26 by way of a first adhesive strip 32 and a second adhesive strip 34 disposed between the unitary touch screen assembly 40 and the display 26. Preferably, the adhesive strips 32, 34 are foam, double-sided adhesive tape, but other suitable adhesives are contemplated such as a silicon adhesive and the like. The strips 32, 34 are preferably positioned at outer edges between display 26 and the unitary touch screen assembly 40. Preferably, the strips 32, 34 are parallel and of a sufficient length to provide enough adhesive to secure the display 26 and assembly 40 to one another, as shown in, for example, FIG. 9. Of course, one of ordinary skill in the art will readily recognize that the unitary touch screen assembly 40 and the display 26 may be secured together by other suitable means, so long as the unitary touch screen assembly 40 and display 26 are secured such that they maintain their orientation to one another, thereby allowing the touch screen 22 and associated electronics (not shown) to accurately register a user's selection.

The touch screen 22 may be any suitable device that responds to touch by a user by generating a signal as is known. One such example is the MICROTOUCH™ touch screen device manufactured by 3M™. In operation, the touch screen device 22 is operatively connected to a controller or computer within the console housing via a cable 23 that is operatively connected to the touch screen device.

The panel of transparent material 24 is preferably tempered glass for both strength and optical characteristics. Other suitable relatively rigid materials are contemplated, such as ordinary glass and transparent plastic and the like. It will be understood that the term transparent refers to the characteristic of permitting light to be transmitted through the material with the objective of a user being able to resolve and recognize text and images, and so on, therethrough. Of course, good optical clarity is preferred.

The gasket material 30 may be any suitable gasket material that retains the adhesive 28 when in a liquid form, resists rapid degradation when exposed to UV light, and is sized and shaped to maintain the gap G at a preferred distance. In a preferred embodiment, the distances may range from about $^{60}/_{1000}$ to $^{30}/_{1000}$ of an inch. Other distances are contemplated approximating a range of about $^{20}/_{1000}$ of an inch to about $^{100}/_{1000}$ of an inch. In a preferred embodiment, the gasket material 30 is adhesive on opposed sides; however, non-adhesive gasket material 30 may also be used so long as the gasket material 30 prevents the adhesive 28 from draining out of the cavity formed by the gasket material 28, touch screen device 22, and transparent material 24.

Other embodiments of the invention may not include gasket material 30, as the gasket is not critical for the functionality of the assembly. Such embodiments would include unitary touch screen 22, adhesive 28, and transparent panel 24 assemblies formed by a process that does not require a gasket to prevent loss of liquid adhesive during the manufacturing process. One of ordinary skill in the art would readily appreciate that such an assembly can be formed by use of, for example, an external frame that prevents leakage of liquid adhesive prior to cure, such frame being removable from the assembly after the adhesive cures. Methods of manufacturing embodiments of the invention are explained in more detail below.

In a preferred embodiment, the adhesive is a UV-curable resin, which, when cured, is optically transparent so as to permit viewing of images and text transmitted therethrough from the display screen. An example of a most preferred adhesive is LOCTITE™ 3492 Light Cure Adhesive, part no. 18666. Other adhesives may also be used, such as conventionally-cured, two-part epoxy, so long as the cure temperature does not produce a condition which might damage the touch screen. Other curable or hardening adhesives are also contemplated, as well as non-hardening adhesives, the objective being to bond together a touch screen device 22 with a transparent and protective panel, pane or layer 24, into a unitary and resilient assembly.

As described above, flat panel display screens can be easily damaged by frontal impact to the display screen. The unitary touch screen assembly 40 is designed to both provide a touch sensitive application and protect the display 26 positioned behind or underneath, and which is easily replaced if damaged or otherwise rendered unusable by being removably attachable to the display or console. Thus combined, the unitary touch screen 40 is used in a most advantageous application with a more fragile or damageable type of display 26, such as an LCD screen. Advantages of the unitary touch screen 40 include a rigid, resilient touch screen assembly constructed of low-cost materials, especially where plastic is used as a transparent panel 24. Other advantages include resistance to shattering, as the curable adhesive resin is relatively flexible as compared to glass, for example, and functions to minimize the stress and strain on the transparent material 24 resulting from frontal impacts. Still other advantages include greatly reduced incidence of touch-screen delamination from the assembly, especially in embodiments having UV-curable resin interposed between the transparent panel 24 and the touch screen 22; in such an assembly, the UV-curable resin and the like bonds strongly to the surfaces of the touch screen 22 and transparent panel 24 such that the assembly becomes essentially unitary.

The adhesive strips 32, 34 may preferably be any double-sided tape suitable for mounting purposes. Of course, the unitary touch screen assembly 40 may be attached to the display 26 by other means, such as a silicon adhesive or even mechanical framework or members without departing from the scope of the invention. However, mechanical framework would be more expensive and increase mechanical coupling between the screen 40 and display 26, which may tend to increase the incidence of damage to the display. The adhesive strips 32, 34 provide for the non-permanent attachment of the unitary touch screen assembly 40 to the display 26. In addition, such strips may act to reduce the amount of force transmitted to the display 26 from a frontal impact to the unitary touch screen assembly 40.

The combined display and unitary touch screen assembly 18 may be installed into a console in much the same way as an ordinary flat panel display is mounted therein, which, as one of ordinary skill in the art will readily appreciate, may be accomplished in any number of ways so long as the display is securely fastened within or to the console housing and visible to the user. Methods and assemblies for mounting flat panel displays are described in application Ser. No. 11/062,111, which is incorporated herein by reference. The unitary touch screen assembly 40 may also be retrofitted onto a console's existing flat panel display (including flat CRT displays) by affixing the assembly 40 to the front of the display in the correct orientation, then connecting the cable 23 to the console's electronics, which would include, for example, a computer or controller. Repair and replacement of the unitary touch screen assembly 40 may be performed much the same way as the initial installation, but with the additional steps of removing the existing touch screen assembly 40 from the front of the display 26, then installing the new touch screen assembly 40 on the existing display 26.

Figure 2:
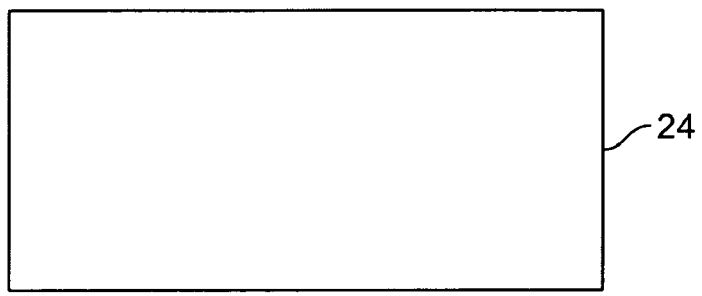
FIG. 2 illustrates a front view of a panel of transparent material.
Figure 3:
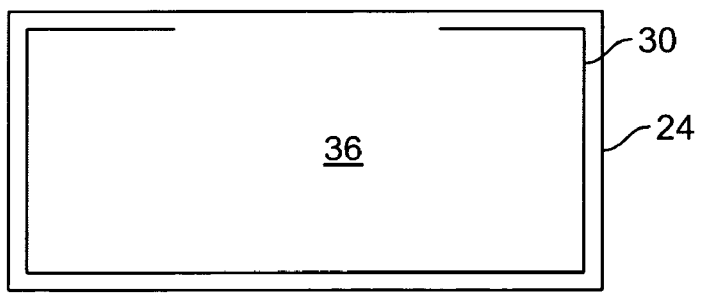
FIG. 3 illustrates a rear view of the transparent material of FIG. 2 including a partial border of gasket material.

FIGS. 2-9 illustrate steps of a preferred method of assembling a combined display and unitary touch screen assembly 18 (see FIG. 1) according to an embodiment of the present invention. A transparent panel 24 is provided (FIG. 2). A generally U-shaped configuration is formed of gasket material 30 on a front side 36 of the panel 22 (see FIG. 3). In a preferred embodiment, the gasket material is distributed at or near the peripheral edges of the front side 36 of the panel 24.

Figure 4:
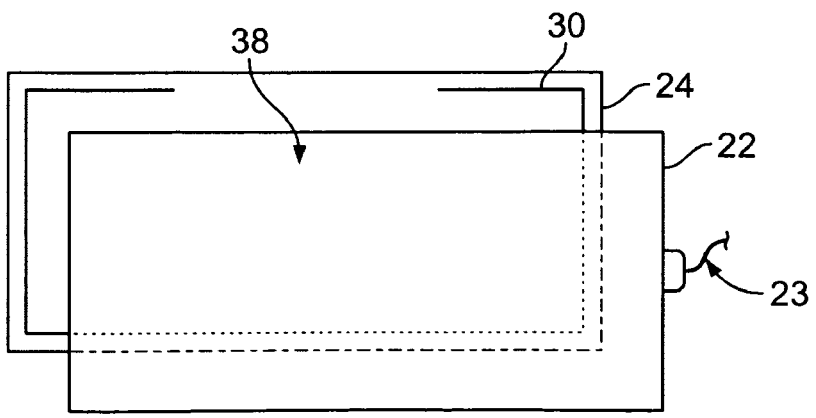
FIG. 4 illustrates a touch screen being combined with the panel of FIG. 3 to form a touch screen assembly.

FIG. 4 illustrates the superimposition of the touch screen 22 with the panel 24 and gasket 30. It will be understood that superimposition of the touch screen 22 means that it is generally aligned with the panel 24 both horizontally and vertically. In another embodiment, the gasket 30 is attached to the touch screen 22 before being superimposed on the panel 24.

In addition to cushioning, adhesive-type gasket material 30 functions to reduce the possibility that the touch screen 22 and transparent panel 24 will move with respect to one another when superimposed and brought together. The gasket 30 also functions to maintain a space between touch screen 22 and transparent panel 24 and further functions to define a well or cavity 38 to receive and prevent loss of liquid adhesive from between touch screen 22 and transparent panel 24 before curing.

Figure 5:
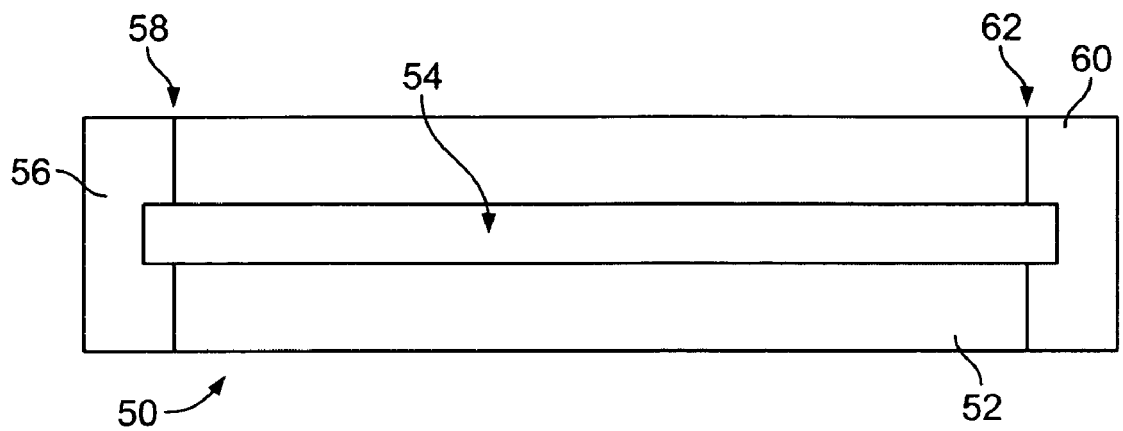
FIG. 5 illustrates a top view of an assembly jig for receiving the combined touch screen assembly of FIG. 4.
Figure 6:
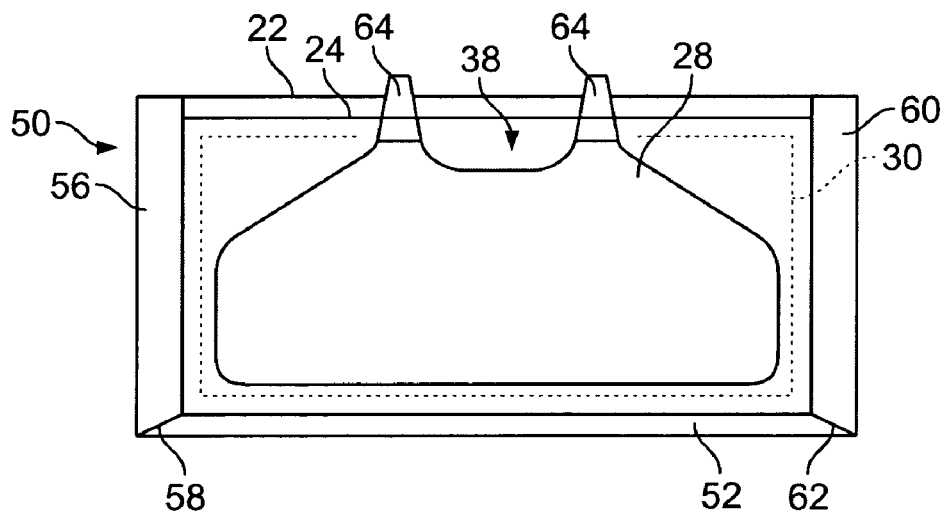
FIG. 6 illustrates a front view of the touch screen assembly of FIG. 4 being secured in the fixture or assembly jig of FIG. 5 and the addition of an adhesive being added to the touch screen assembly while secured in the jig.
Figure 7:
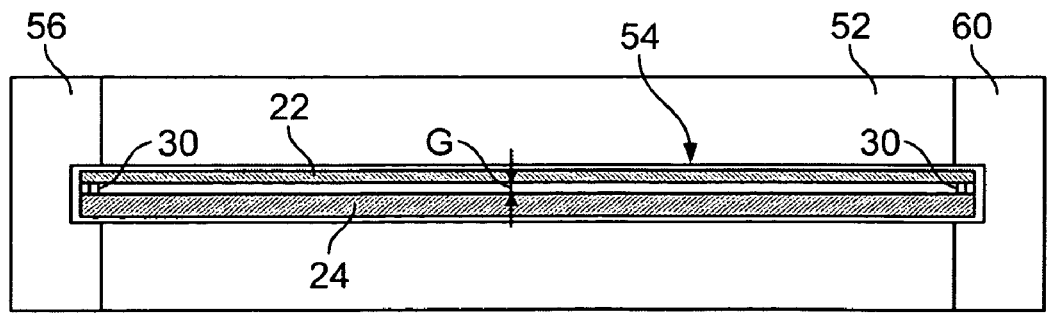
FIG. 7 illustrates a top view of the jig and secured touch screen assembly.

FIGS. 5-7 illustrate a jig or fixture 50 which holds the assembled touch screen 22 and transparent panel 24 while adhesive 28 is being added in a liquid form. The jig 50 includes a base portion 52, that preferably includes a longitudinal slot or groove 54. A first side 56 extends vertically from a first end 58 of the base portion 52 and is pivotally attached thereto. A second side 60 extends vertically from a second end 62 and is pivotally attached thereto. Each of the first side 56 and the second side 60 of jig 50 includes a vertical extension of the base portion slot 54. The slot 54 is sized and shaped to receive the assembled touch screen 22 and transparent panel 24 spaced by the gasket 30 (see FIG. 4) and to hold the assembly with the gap G at a predetermined distance.

Turning to FIG. 6, the jig 50 holds the aligned touch screen 22 and transparent panel 24. The gasket 30 is in position to define well 38. Filler nozzles 64, which are preferably flattened to fit in the gap G, are introduced into opening 38 and adhesive 28 is introduced between the touch screen 22 and transparent panel 24.

Although the assembly of the touch screen 22, adhesive 28, and transparent panel 24 has been described above in conjunction with the use of a sealing gasket 30, one skilled in the art will readily appreciate that other methods of providing the adhesive to the well 38 may be used without departing from the scope of the invention. For example, the assembly may be formed in the jig 50 or other such framework such that the frame sides prevent leakage of resin from the gap G by forming a tight seal against the peripheral edges of the touch screen 22 and panel 24 before and during the curing process.

Figure 8:
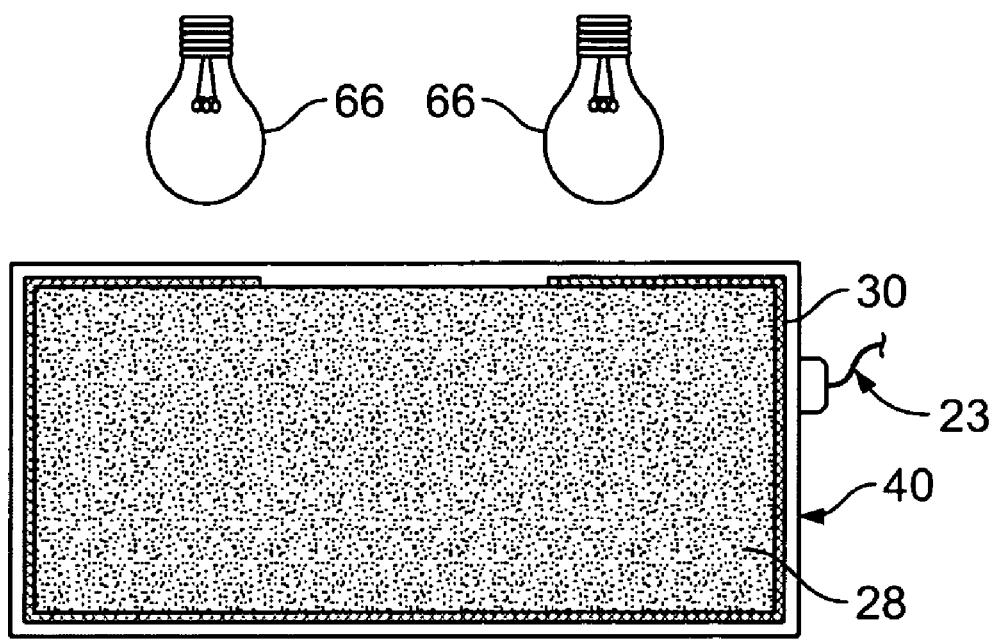
FIG. 8 illustrates the curing step of the assembly shown in FIG. 7.

Turning to FIG. 8, after introduction of the adhesive 28 in between touch screen 22 and transparent panel 24, the adhesive is cured by, for example, a source of UV light 66. It will be understood that the unitary touch screen assembly 40 is still in jig 50 (see FIG. 7) and is formed by the curing step, which bonds the touch screen 22 and transparent panel 24 together. One of ordinary skill in the art will appreciate that the wavelength of light and duration of exposure will vary depending on the curable adhesive used.

Figure 9:
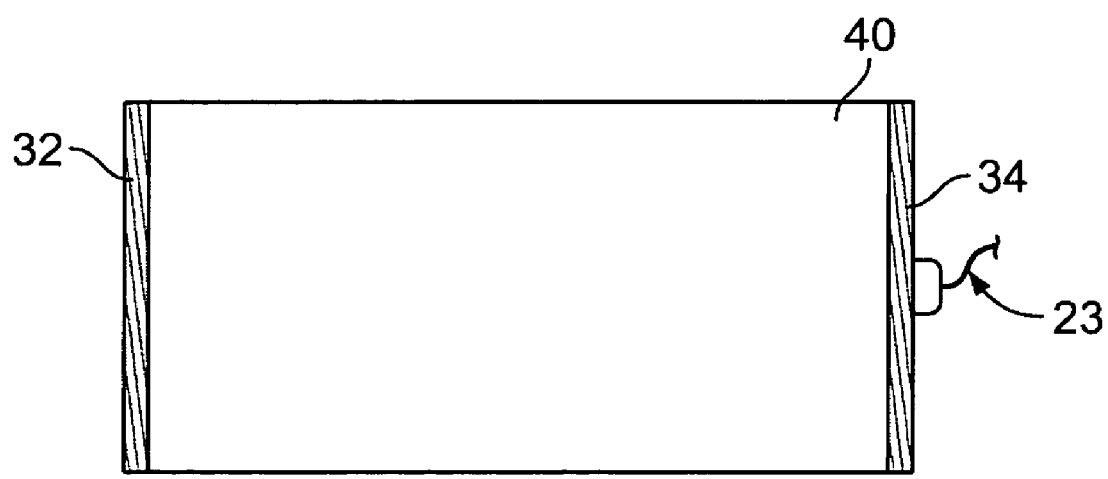
FIG. 9 illustrates a rear view of the unitary touch screen assembly including applied mounting tape.

FIG. 9 illustrates placement of the adhesive strips 32 on the unitary touch screen 40 before combining the unitary touch screen 40 with a display device 26 to form the apparatus shown in FIG. 1. Of course, it will be understood that the strips 32, 34 may be applied to a display 26 and then the unitary touch screen 40 may be applied thereon. And, as previously explained, other methods exist to either permanently or removably attach the assembly 40 to the display 26 without departing from the scope of the invention.

While the apparatus and method herein disclosed forms a preferred embodiment of this invention, this invention is not limited to that specific apparatus and method, and changes can be made therein without departing from the scope of this invention, which is defined in the appended claims.

What is claimed is:

1. A touch screen assembly, comprising:
   a panel of transparent material having a transparent panel front side and a transparent panel back side opposite the transparent panel front side;
   an independently functioning touch screen device having a device interactive side and a device back side opposite the device interactive side, the touch screen device being positioned at least about $30/1000$ of an inch away from the transparent panel front side, the touch screen device being positioned in an orientation generally corresponding to the orientation of the transparent panel front side, the device back side being in an opposed relationship to the transparent panel front side; and
   a resilient panel disposed between at least a portion of the transparent panel front side and the device back side, the resilient panel having a low modulus of elasticity relative to the transparent panel, the resilient panel being permanently attached to at least a portion of the transparent panel front side and at least a portion of the device back side; and
   wherein the transparent panel, the touch screen, and the resilient panel comprising a unitary assembly and the unitary assembly is removably attached to a display screen.

2. The assembly of claim 1, wherein the resilient panel is formed of a UV cured compound.

3. The assembly of claim 1, wherein the panel of transparent material is glass.

4. The assembly of claim 1, wherein the panel of transparent material is plastic.

5. The assembly of claim 1, wherein the resilient panel has a periphery, and further including a gasket interposed between the transparent panel front side and the device back side, the gasket being positioned at the resilient panel periphery.

6. The assembly of claim 1, further including a video display positioned adjacent the transparent panel back side of the unitary assembly, the video display being positioned in an orientation generally corresponding to the orientation of the touch screen device.

7. The assembly of claim 6 wherein the display includes a display screen and a frame having a plurality of sides surrounding the display screen, and further including at least one frame adhesive interposed between the transparent panel back side and at least one frame side.

8. The assembly of claim 6 further including:
   a console housing, the console housing including a console front side, the console front side including an opening disposed in the console front side, the console housing further defining a console interior, and wherein the touch screen assembly is disposed within the console interior and the touch screen interactive side is viewable through the opening; and
   a controller disposed within the console interior, the controller being configured to receive an input signal from the touch screen device and provide a video signal to the video display, and wherein the controller is in communication with the touch screen device and the video display.

9. A method of making a unitary touch screen assembly for use with a display, comprising:
providing a panel of transparent material in a predetermined orientation, the transparent panel having a transparent panel front side and a transparent panel back side opposite the transparent panel front side;
providing an independently functioning touch screen device, the touch screen device having a device interactive side and a device back side opposite the device interactive side;
orienting the touch screen device in a position corresponding to the orientation of the panel of transparent material, the device back side being in an opposed relationship to the transparent panel front side;
positioning the touch screen device at least about $30/1000$ of an inch from the panel of transparent material to define a space therebetween;
disposing a curable and optically clear compound into the space; and
curing the compound to form a resilient panel, the resilient panel having a low modulus of elasticity relative to the transparent panel, the resilient panel being permanently adhered to at least a portion of the device back side and at least a portion of the transparent panel front side;
and wherein the unitary touch screen assembly is removably attached to a display screen.

10. The method of claim 9, further including
providing a video display in a position corresponding to the orientation of the touch screen device, the video display including a display screen; and
positioning the video display behind the panel of transparent material, the video display screen being visible through the touch screen device.

11. The method of claim 10 wherein the panel of transparent material includes a panel perimeter, and further including interposing a gasket between the transparent panel front side and the device back side, the gasket being positioned adjacent the transparent panel perimeter.

12. The method of claim 11 wherein the transparent panel perimeter includes a plurality of opposed straight sides, and wherein the gasket extends continuously along at least three of the sides.

13. The method of claim 9 wherein
the compound is a UV curable compound, and further including providing a UV light source; and
wherein curing the compound includes exposing the assembly to the UV light source for a predetermined amount of time.

14. The method of claim 9 further comprising:
providing a console, the console including a console housing, the console housing including a console front side, the console front side including an opening disposed in the console front side, the console housing further defining a console interior; and
disposing the assembly within the console interior, the device interactive side being viewable through the opening.

15. The method of claim 14 further comprising
providing a controller within the console interior; and
configuring the controller to receive signals from the touch screen device and provide signals to the video display.

* * * * *